(12) United States Patent
Nakagawa et al.

(10) Patent No.: US 11,173,393 B2
(45) Date of Patent: Nov. 16, 2021

(54) OPERATION DEVICE AND CONTROL APPARATUS THEREFOR

(71) Applicant: Sony Interactive Entertainment Inc., Tokyo (JP)

(72) Inventors: Yusuke Nakagawa, Kanagawa (JP); Yukari Konishi, Tokyo (JP); Ikuo Yamano, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 60 days.

(21) Appl. No.: 16/648,222

(22) PCT Filed: Sep. 29, 2017

(86) PCT No.: PCT/JP2017/035570
§ 371 (c)(1),
(2) Date: Mar. 17, 2020

(87) PCT Pub. No.: WO2019/064518
PCT Pub. Date: Apr. 4, 2019

(65) Prior Publication Data
US 2020/0282310 A1 Sep. 10, 2020

(51) Int. Cl.
*A63F 13/285* (2014.01)
*A63F 13/24* (2014.01)
(Continued)

(52) U.S. Cl.
CPC ............ *A63F 13/285* (2014.09); *A63F 13/24* (2014.09); *A63F 13/92* (2014.09); *G06F 3/016* (2013.01);
(Continued)

(58) Field of Classification Search
USPC .......................................................... 463/30
See application file for complete search history.

(56) References Cited

U.S. PATENT DOCUMENTS

| 5,555,894 A | 9/1996 | Yoshiaki |
| 5,734,373 A | 3/1998 | Rosenberg |
| (Continued) | | |

FOREIGN PATENT DOCUMENTS

| CN | 101610877 A | 12/2009 |
| CN | 104043246 A | 9/2014 |
| (Continued) | | |

OTHER PUBLICATIONS

Notice of Reasons for Refusal for related application JP Application No. 2019549971, 8 pages, dated Apr. 20, 2021.
(Continued)

*Primary Examiner* — Pierre E Elisca
(74) *Attorney, Agent, or Firm* — Matthew B. Dernier, Esq.

(57) ABSTRACT

A control apparatus for an operation device, the control apparatus being connected to the operation device including an operation member and a tactile presentation mechanism, the control apparatus receives an operational input by a user to the operation member, presents a tactile sensation that corresponds to the operational input to the user by causing the tactile presentation mechanism to operate when the operational input is received, and varies contents of the tactile sensation to be presented to the user in accordance with contents of the received operational input.

14 Claims, 6 Drawing Sheets

(51) Int. Cl.
 *A63F 13/92* (2014.01)
 *G06F 3/01* (2006.01)
(52) U.S. Cl.
 CPC ............... *A63F 2300/1043* (2013.01); *A63F 2300/1056* (2013.01)

(56) References Cited

U.S. PATENT DOCUMENTS

| | | | |
|---|---|---|---|
| 5,982,354 A | 11/1999 | Arita | |
| 5,999,168 A | 12/1999 | Rosenberg | |
| 6,380,925 B1 | 4/2002 | Martin | |
| 6,468,158 B1* | 10/2002 | Ootori | G05G 9/047 463/38 |
| 7,196,688 B2 | 3/2007 | Schena | |
| 8,059,089 B2 | 11/2011 | Daniel | |
| 8,491,388 B2 | 7/2013 | Miyazaki | |
| 8,686,961 B2 | 4/2014 | Ikuo | |
| 9,164,587 B2 | 10/2015 | Da Costa | |
| 9,174,134 B1 | 11/2015 | Grant | |
| 9,174,344 B2 | 11/2015 | Nahavandi | |
| 9,490,088 B2 | 11/2016 | Akira | |
| 9,557,830 B2 | 1/2017 | Grant | |
| 9,606,569 B2 | 3/2017 | Zentaro | |
| 9,778,743 B2 | 10/2017 | Grant | |
| 9,785,237 B2 | 10/2017 | Takayuki | |
| 10,124,252 B2 | 11/2018 | Grant | |
| 10,133,354 B2 | 11/2018 | Grant | |
| 10,159,896 B2 | 12/2018 | Strahle | |
| 10,185,396 B2 | 1/2019 | Rihn | |
| 10,216,278 B2 | 2/2019 | Nakamura | |
| 10,226,693 B2 | 3/2019 | Strahle | |
| 10,300,778 B2* | 5/2019 | Nomizo | B60K 5/12 |
| 10,353,471 B2 | 7/2019 | Da Costa | |
| 10,509,472 B2 | 12/2019 | Grant | |
| 10,534,432 B2 | 1/2020 | Yasushi | |
| 10,632,367 B2 | 4/2020 | Strahle | |
| 2001/0002126 A1 | 5/2001 | Rosenberg | |
| 2001/0008849 A1* | 7/2001 | Komata | A63F 13/10 463/37 |
| 2001/0030658 A1 | 10/2001 | Rosenberg | |
| 2002/0054060 A1* | 5/2002 | Schena | G05G 9/047 715/701 |
| 2002/0190528 A1 | 12/2002 | Ootori | |
| 2004/0113932 A1 | 6/2004 | Rosenberg | |
| 2005/0156892 A1 | 7/2005 | Grant | |
| 2006/0028095 A1 | 2/2006 | Maruyama | |
| 2009/0131171 A1 | 5/2009 | Miyazaki | |
| 2010/0092267 A1 | 4/2010 | Najdovski | |
| 2011/0134034 A1 | 6/2011 | Daniel | |
| 2012/0026110 A1 | 2/2012 | Ikuo | |
| 2012/0038468 A1 | 2/2012 | Provancher | |
| 2012/0105367 A1 | 5/2012 | Son | |
| 2012/0154134 A1 | 6/2012 | Lim | |
| 2013/0147610 A1* | 6/2013 | Grant | A63F 13/24 340/12.5 |
| 2013/0265149 A1 | 10/2013 | Norio | |
| 2013/0267321 A1 | 10/2013 | Burgess | |
| 2013/0321273 A1 | 12/2013 | O'Keeffe | |
| 2014/0094310 A1 | 4/2014 | Bleich | |
| 2014/0139451 A1 | 5/2014 | Levesque | |
| 2014/0274398 A1 | 9/2014 | Grant | |
| 2014/0305783 A1* | 10/2014 | Kagayama | A63F 13/285 200/521 |
| 2014/0315642 A1 | 11/2014 | Grant | |
| 2015/0002416 A1 | 1/2015 | Hideyuki | |
| 2015/0035658 A1 | 2/2015 | Provancher | |
| 2015/0042461 A1 | 2/2015 | Shinozaki | |
| 2015/0098004 A1 | 4/2015 | Zentaro | |
| 2015/0130707 A1* | 5/2015 | Da Costa | A63F 13/23 345/156 |
| 2015/0133221 A1 | 5/2015 | Grant | |
| 2016/0051986 A1* | 2/2016 | Lin | B01L 3/50273 506/7 |
| 2016/0132114 A1 | 5/2016 | Rihn | |
| 2016/0259536 A1 | 9/2016 | Kudurshian | |
| 2016/0313795 A1 | 10/2016 | Fumio | |
| 2016/0361639 A1 | 12/2016 | Schmitz | |
| 2017/0031442 A1 | 2/2017 | Dabic | |
| 2017/0203208 A1 | 7/2017 | Sato | |
| 2017/0351394 A1 | 12/2017 | Kazuhito | |
| 2018/0018020 A1 | 1/2018 | Grant | |
| 2018/0250587 A1 | 9/2018 | Strahle | |
| 2018/0284893 A1* | 10/2018 | Shimizu | G06F 3/016 |
| 2018/0333642 A1 | 11/2018 | Strahle | |
| 2019/0025916 A1 | 1/2019 | Yasushi | |
| 2019/0038968 A1 | 2/2019 | Yuichi | |
| 2019/0118081 A1 | 4/2019 | Strahle | |
| 2019/0224565 A1 | 7/2019 | Yamano | |

FOREIGN PATENT DOCUMENTS

| | | |
|---|---|---|
| CN | 104107539 | 10/2014 |
| CN | 104798013 A | 7/2015 |
| EP | 0626634 A2 | 11/1994 |
| EP | 0852789 A1 | 7/1998 |
| EP | 1524578 A1 | 4/2005 |
| EP | 2778852 A2 | 9/2014 |
| EP | 2796965 A2 | 10/2014 |
| EP | 2873446 A1 | 5/2015 |
| JP | 7194846 A | 8/1995 |
| JP | 07220563 A | 8/1995 |
| JP | 11514469 A | 12/1999 |
| JP | 2000195370 A | 7/2000 |
| JP | 2003519861 A | 6/2003 |
| JP | 2003330585 A | 11/2003 |
| JP | 2005190465 A | 7/2005 |
| JP | 3686686 B2 | 8/2005 |
| JP | 2006157642 A | 6/2006 |
| JP | 2007330369 A | 12/2007 |
| JP | 2008173186 A | 7/2008 |
| JP | 2008257295 A | 10/2008 |
| JP | 2008257748 A | 10/2008 |
| JP | 2009119125 A | 6/2009 |
| JP | 2010020526 A | 1/2010 |
| JP | 2012027875 A | 2/2012 |
| JP | 2012118761 A | 6/2012 |
| JP | 2012128499 A | 7/2012 |
| JP | 2013045230 A | 3/2013 |
| JP | 2013117900 A | 6/2013 |
| JP | 2014174660 A | 9/2014 |
| JP | 2014180572 A | 9/2014 |
| JP | 2014216017 A | 11/2014 |
| JP | 2015011470 A | 1/2015 |
| JP | 2015075912 A | 4/2015 |
| JP | 2015111417 A | 6/2015 |
| JP | 2015111542 A | 6/2015 |
| JP | 2016001510 A | 1/2016 |
| JP | 2016067667 A | 5/2016 |
| JP | 2016095625 A | 5/2016 |
| JP | 2017508191 A | 3/2017 |
| KR | 20050048902 A | 5/2005 |
| KR | 1020150056070 A | 5/2015 |
| WO | 9712357 A1 | 4/1997 |
| WO | 2005116802 A1 | 12/2005 |
| WO | 2013099742 A1 | 7/2013 |
| WO | 2015092966 A1 | 6/2015 |
| WO | 2016051986 A1 | 4/2016 |
| WO | 2016105496 A1 | 6/2016 |
| WO | 2016114269 A1 | 7/2016 |
| WO | 2017150128 A1 | 9/2017 |
| WO | 2017150129 A1 | 9/2017 |

OTHER PUBLICATIONS

Notice of Reason for Refusal for corresponding JP Application No. 2019-221160, 6 pages, dated Sep. 18, 2020.

Notice of Reasons for Refusal for related application JP Application No. 2020104664, 10 pages, dated Mar. 29, 2021.

Office Action for related U.S. Patent Application No. 16/311,774, 10 pages, dated Apr. 27, 2020.

(56) References Cited

OTHER PUBLICATIONS

International Preliminary Report on Patentability and Written Opinion for corresponding PCT Application No. PCT/JP2017/035570, 20 pages, dated Apr. 9, 2020.
Office Action for corresponding Korean Application No. 10-2019-7002594, 10 pages, dated Mar. 26, 2020.
International Search report for related application PCT/JP2017/038937, 4 pages, dated Jan. 30, 2018.
International Preliminary Report on Patentability and Written Opinion for related PCT Application No. PCT/JP2017/038937, 14 pages, dated May 7, 2020.
International Search Report for related PCT Application No. PCT/JP2017/004763, 2 pages, dated Apr. 18, 2017.
International Preliminary Report on Patentability and Written Opinion for related PCT Application No. PCT/JP2017/004763, 11 pages, dated Sep. 13, 2018.
International Search Report for related PCT Application No. PCT/JP2017/017909, 7 pages, dated Jul. 18, 2017.
International Search Report for related PCT Application No. PCT/2017/004978, 4 pages, dated Mar. 14, 2017.
International Search Report for related PCT Application No. PCT/JP2017/018914, 2 pages, dated Aug. 22, 2017.
International Preliminary Report on Patentability and Written Opinion for related PCT Application No. PCT/JP2017/017909, 17 pages, dated Feb. 7, 2019.
International Preliminary Report on Patentability and Written Opinion for related PCT Application No. PCT/JP2017/018914, 13 pages, dated Feb. 7, 2019.
International Preliminary Report on Patentability and Written Opinion for related PCT Application No. PCT/PCT/2017/004978, 13 pages, dated Jan. 31, 2019.
Notification of Reasons for Refusal for related JP Application No. 2018-528391, 9 pages, dated Apr. 23, 2019.
Extended European Search Report for related EP Application No. 17833789.5, 10 pages, dated May 23, 2019.
Supplementary Search Report for relatedng European Search Report for corresponding Application No. 17833805, 12 pages, dated Jul. 19, 2019.
Decision of Refusal for related Japanese Patent Application No. 2018-528391, 10 pages, dated Jul. 9, 2019.
Extended European Search Report for related European Application No. 17759599.8, 7 pages, dated Sep. 9, 2019.
Korean Office Action for related Application No. 1020197002594, 11 pages, dated Sep. 18, 2019.
Extended European Search Report for corresponding Application No. 17833805.9, 14 pages, dated Nov. 6, 2019.
Notification of Reasons for Refusal for corresponding Application No. JP2018-529371, 9 pages, dated Oct. 29, 2019.
International Search Report for corresponding PCT Application No. PCT/JP2017/035570, 8 pages, dated Dec. 26, 2017.
Extended European Search Report application EP Application No. 21159343.9, 11 pages, dated May 21, 2021.
Notice of Reason for Refusal for corresponding JP Application No. 2019-214619, 6 pages, dated Sep. 2, 2020.
Notice of Reason for Refusal for corresponding JP Application No. 2019-184529, 10 pages, dated Sep. 2, 2020.
The First Office Action for related CN Application No. 201780044599.0, 20 pages, dated Jun. 4, 2021.
First Office Action for corresponding CN Application No. 201780044603.3, 21 pages dated Jun. 29, 2021.

* cited by examiner

| DATA SET 1 | | |
|---|---|---|
| | OPERATION BUTTON 23a | |
| WAVEFORM DATA TYPE | PCM | |
| WAVEFORM DATA CONTENTS | [PCM DATA] | |
| VIBRATION FLAG AT TIME OF PRESSING DOWN | 1 | ..... |
| VIBRATION FLAG AT TIME OF RELEASING | 1 | |
| REPETITION FLAG | 1 | |
| REPETITION CYCLE | 10Hz | |
| DELAY TIME | 300ms | |
| OPERATION WHEN OPERATION BUTTON IS UNUSED | NO OPERATION | |

OPERATION DEVICE AND CONTROL APPARATUS THEREFOR

TECHNICAL FIELD

The present invention relates to an operation device that presents a tactile sensation in accordance with an operation by a user, a control apparatus therefor, a control method therefor, and a control program therefor.

BACKGROUND ART

Some of operation devices each accepting an operational input from a user like a controller or the like that is connected to a smartphone or a home-use game console include a tactile presentation mechanism that presents a tactile sensation to a user by generating a vibration or the like. Such operation device causes the tactile presentation mechanism to operate at a timing at which a user operates an operation button, for example, to present a haptic response in accordance with the operation by the user, thereby improving an operation feeling.

SUMMARY

Technical Problems

In the operation device according to the technique of the above conventional example, for example, disposing an individual tactile presentation mechanism for each operation button consequently incurs an increase in cost and an increase in size of the apparatus. In contrast, when presentation of tactile sensations for various types of operation is attempted with use of a common tactile presentation mechanism, reactions consequently become uniform, so that improvement of the operation feeling is hardly achieved.

The present invention has been made in view of the above circumstances, and one of objects thereof is to provide an operation device capable of effectively presenting a tactile sensation in accordance with an operation by a user, a control apparatus therefor, a control method therefor, and a control program therefor.

Solution to Problems

A control apparatus for an operation device according to the present invention is a control apparatus for an operation device, the control apparatus being connected to the operation device including an operation member and a tactile presentation mechanism, the control apparatus including an operational input receiving part receiving an operational input by a user to the operation member, and a tactile sensation presenting part presenting a tactile sensation that corresponds to the operational input, to the user by causing the tactile presentation mechanism to operate when the operational input is received, in which the tactile sensation presenting part varies contents of the tactile sensation to be presented to the user, in accordance with contents of the operational input received by the operational input receiving part.

An operation device according to the present invention includes an operation member, a structure that is coupled with the operation member, and a vibration mechanism that has one end thereof fixed to the structure and the other end thereof supported by another supporting body, wherein the structure has stiffness that is higher than the another supporting body.

A control method for an operation device according to the present invention is a control method for an operation device including an operation member and a tactile presentation mechanism, the control method including an operational input receiving step of receiving an operational input by a user to the operation member, and a tactile presentation step of presenting a tactile sensation that corresponds to the operational input, to the user by causing the tactile presentation mechanism to operate when the operational input is received, in which, at the tactile presentation step, contents of the tactile sensation to be presented to the user are varied in accordance with contents of the operational input received at the operational input receiving step.

A program according to the present invention is a program for controlling an operation device including an operation member and a tactile presentation mechanism, the program causing a computer to function as an operational input receiving part receiving an operational input by a user to the operation member, and a tactile sensation presenting part presenting a tactile sensation that corresponds to the operational input, to the user by causing the tactile presentation mechanism to operate when the operational input is received, in which the tactile sensation presenting part varies contents of the tactile sensation to be presented to the user, in accordance with contents of the operational input received by the operational input receiving part.

DESCRIPTION OF EMBODIMENTS

Embodiments of the present invention will be described below with reference to the drawings.

First Embodiment

Figure 1:
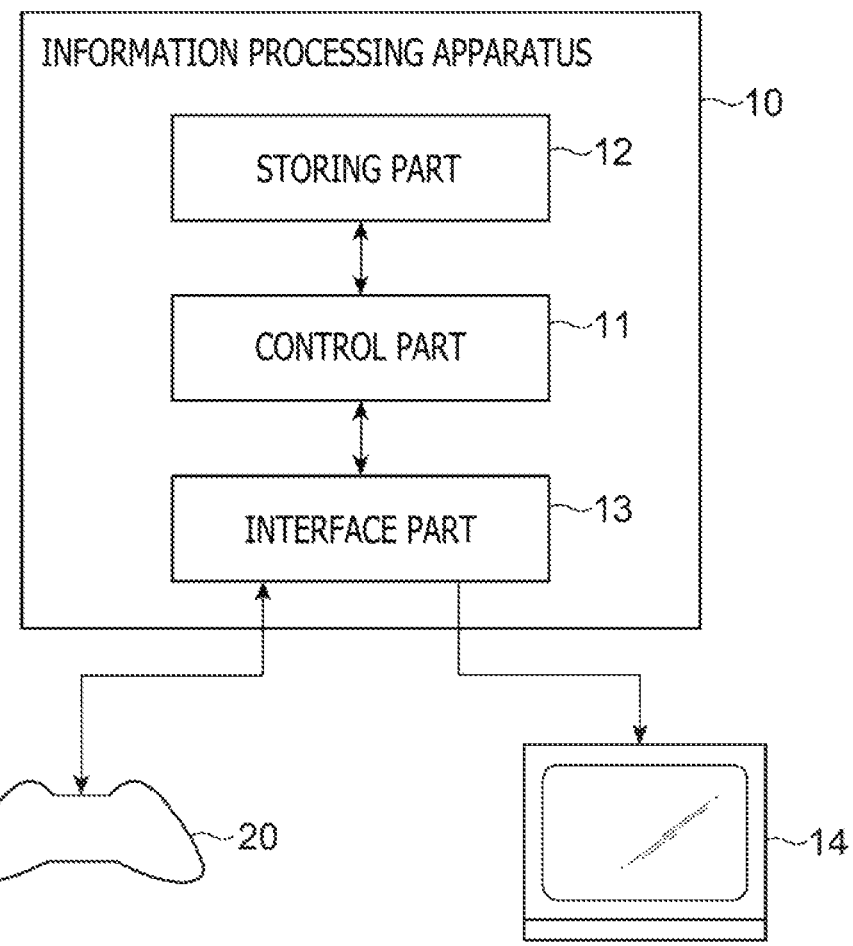
FIG. 1 is a block diagram depicting an example of a configuration of a system that includes an operation device according to a first embodiment of the present invention.

The first embodiment of the present invention will first be described. As depicted in FIG. 1, in this embodiment, an information processing apparatus 10 functioning as a control apparatus is communicably connected to an operation device 20.

The operation device 20 is a device that is used by a user being held by the user' hand, being worn on the user's body, or the like. The operation device 20 incorporates therein a vibration mechanism 21 and presents a vibration to the user by causing this vibration mechanism 21 to operate. The vibration mechanism 21 may be various types of vibration generation element such as a linear resonance actuator, a voice coil motor, or an eccentric motor. In this embodiment, it is assumed that the operation device 20 incorporates therein a plurality of the vibration mechanisms 21. More specifically, a vibration mechanism 21a and a vibration mechanism 21b are disposed respectively in a grip portion that the user grips with the user's left hand and a grip portion that the user grips with the user's right hand.

Figure 2:
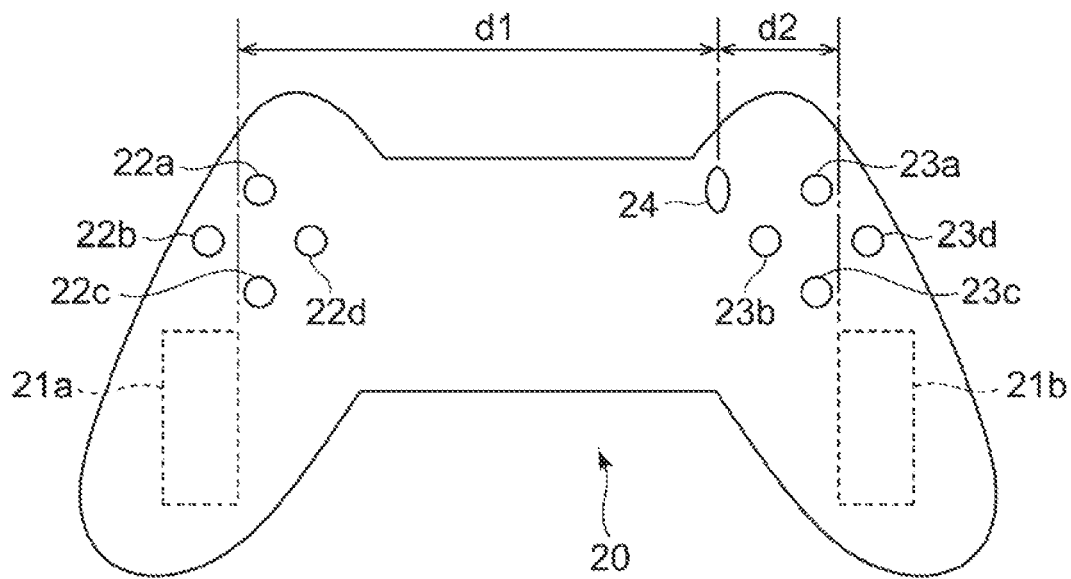
FIG. 2 is a diagram depicting an outer appearance of the operation device.

Moreover, the operation device 20 includes various types of operation member such as operation buttons, levers, and touch sensors to be operated by the user. More specifically, in this embodiment, as depicted in FIG. 2, a plurality of operation buttons 22a to 22d are disposed on the left side of the operation device 20, a plurality of operation buttons 23a to 23d are disposed on the right side thereof, and an operation button 24 is disposed at a position that is closer to the center than the operation buttons 23a to 23d on the right side thereof are.

The information processing apparatus 10 may be, for example, a home-use game console or a personal computer. Moreover, in this embodiment, the information processing apparatus 10 is also communicably connected to a display apparatus 14. As depicted in FIG. 1, this information processing apparatus 10 includes a control part 11, a storing part 12, and an interface part 13.

The control part 11 includes at least one processor, and executes various types of information process in accordance with a program stored in the storing part 12. A specific example of the processes executed by the control part 11 will be described later in detail.

The storing part 12 includes a memory device and the like, and retains the program to be executed by the control part 11. This program may be a program that is provided being stored in a computer-readable and non-transitory storage medium and that is copied into this storing part 12. Moreover, this storing part 12 also operates as a working memory for the control part 11.

The interface part 13 includes a serial interface such as a universal serial bus (USB), or a wireless communication interface such as Bluetooth (a registered trademark). The information processing apparatus 10 is communicably connected to the operation device 20 through this interface part 13. Especially, in this embodiment, the interface part 13 transmits a control signal to cause the vibration mechanism 21 to operate in accordance with an instruction from the control part 11. Furthermore, the interface part 13 includes a communication interface to communicate with the display apparatus 14 by wire or wireless. The information processing apparatus 10 transmits a video signal that indicates contents of the video to be displayed by the display apparatus 14 thereon to the display apparatus 14 through the interface part 13.

The display apparatus 14 displays thereon the video based on the video signal transmitted from the information processing apparatus 10. The display apparatus 14 may be, for example, a home-use television or a liquid crystal display, or may be a device of a type to be used being mounted to the user's head by the user such as a head mounted display.

Figure 3:
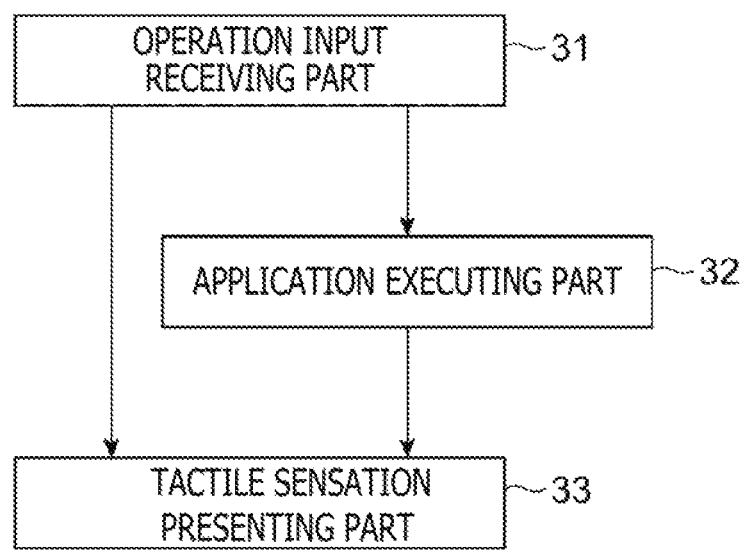
FIG. 3 is a functional block diagram depicting functions of an information processing apparatus.

A specific example of functions realized by the control part 11 of the information processing apparatus 10 will be described below. As depicted in FIG. 3, in this embodiment, the control part 11 functionally includes an operational input receiving part 31, an application executing part 32, and a tactile sensation presenting part 33. These functions are realized by the operation of the control part 11 in accordance with the program stored in the storing part 12. This program may be provided to the information processing apparatus 10 through a communication network such as the Internet, or may be provided being stored in a computer-readable information storage medium such as an optical disc.

The operational input receiving part 31 receives an operational input by the user to the operation members disposed on the operation device 20. More specifically, in a case where the user presses down any of the operation buttons, the operation device 20 transmits a control signal including information that identifies the operation button that is pressed down, to the information processing apparatus 10. The operational input receiving part 31 refers to this control signal transmitted by the operation device 20 and identifies contents of the operation by the user.

The application executing part 32 reads an application program and thereby executes the processes thereof. In this embodiment, the application executing part 32 executes various types of processes in accordance with the contents of the operation by the user received by the operational input receiving part 31, and causes the display apparatus 14 to display a result of the execution on a screen thereof. Moreover, the application executing part 32 may output a vibration instruction that causes the vibration mechanism 21 incorporated in the operation device 20 to operate in accordance with contents of the process.

The tactile sensation presenting part 33 outputs a control order that causes the vibration mechanism 21 to vibrate, to the operation device 20. More specifically, in a case where the application executing part 32 outputs the vibration instruction, the tactile sensation presenting part 33 outputs a control order that causes a vibration in accordance with contents of the instruction to be generated, to the operation device 20. For example, in a case where the application executing part 32 executes an application program such as a game, the operation device 20 can thereby present a vibration to express an impact or the like in the game to the user in accordance with the contents of the process. Hereinafter, the vibration generated by the vibration mechanism 21 in accordance with the content of the process executed by the application executing part 32 will be referred to as "application vibration."

Moreover, at a timing at which the operational input receiving part 31 receives the operational input, the tactile sensation presenting part 33 outputs the control order to present the tactile sensation to the user. The vibration mechanism 21 generates a vibration in accordance with this control order, and accordingly, the tactile sensation corresponding to the operational input is presented to the user. Hereinafter, the vibration generated by the vibration mechanism 21 in accordance with the operational input by the user will be referred to as "feedback vibration." When the user operates an operation member on a front surface of the operation device 20, the tactile sensation different from a physical sense of touch possessed by the operation member itself can be presented to the user by causing the feedback vibration to be generated, and the operation feeling can be improved.

Furthermore, the tactile sensation presenting part 33 varies contents of the feedback vibration in accordance with the contents of the operation by the user received by the operational input receiving part 31. More specifically, the tactile sensation presenting part 33 varies a strength of the vibration to be generated by each of the vibration mechanisms 21 incorporated in the operation device 20 in accordance with the position of the operation member operated by the user. To be more detailed, it is assumed that, in accordance with a distance from the operation member operated by the user to each of the vibration mechanisms, a vibration mechanism with a shorter distance generates a stronger vibration. For example, in a case where the user operates any of the operation buttons disposed between the vibration mechanism 21a and the vibration mechanism 21b, the tactile sensation presenting part 33 determines a ratio of the strength of the vibration to be generated by each of the vibration mechanisms 21 in accordance with a ratio of the distance from the operation button to each of the vibration mechanisms 21.

As an example, a case where the user operates the operation button 24 will be described. The distance d1 from the operation button 24 to the vibration mechanism 21a is an approximately fourfold distance of a distance d2 from the operation button 24 to the vibration mechanism 21b. The tactile sensation presenting part 33 therefore causes both of the vibration mechanisms 21 to vibrate such that an output ratio of the vibration mechanism 21a and the vibration mechanism 21b is 1:4. The operation device 20 can thereby present a tactile sensation that corresponds to the operational input by the user in a manner for the user to be less likely to feel a sense of discomfort, using the vibration mechanisms 21a and 21b disposed at respective positions distant from the operation button 24 operated by the user.

Moreover, in a case where the user operates the operation buttons 23a to 23d disposed at respective positions closer to the vibration mechanism 21b than the operation button 24, the tactile sensation presenting part 33 determines the strength of each of the feedback vibrations of the vibration mechanisms 21a and 21b such that the output ratio of the vibration mechanism 21a and the vibration mechanism 21b becomes greater than that in the example for the operation button 24. Otherwise, when the user operates the operation member at a position with which the ratio of the distance becomes a magnitude equal to or greater than a predetermined value, the tactile sensation presenting part 33 may cause only the vibration mechanism 21 that is present at a closer position to operate. For example, in a case where the operation buttons 22a to 22d are operated, the tactile sensation presenting part 33 may cause only the vibration mechanism 21a to generate the feedback vibration, while, in a case where the operation buttons 23a to 23d are operated, the tactile sensation presenting part 33 may cause only the vibration mechanism 21b to generate the feedback vibration.

Furthermore, the tactile sensation presenting part 33 may vary the vibration waveform of the feedback vibration to be generated, in accordance with the position of the operation member operated by the user. For example, the tactile sensation presenting part 33 can present a feeling like being pulled in any one direction, to the user, by causing each of the vibration mechanisms to generate a vibration based on a vibration waveform biased to the direction. Hereinafter, the feeling as this will be referred to as "pseudo kinesthetic sense," and a vibration causing the pseudo kinesthetic sense will be referred to as "pseudo kinesthetic sense vibration." The tactile sensation presenting part 33 may generate, as the feedback vibration, such a pseudo kinesthetic sense vibration that causes the user to feel a pseudo kinesthetic sense directed to the position at which the operation member is disposed. As a specific example, in a case where the user operates the operation button 22a disposed on the upper side and on the left side from the user, the tactile sensation presenting part 33 causes the vibration mechanism 21a to generate a pseudo kinesthetic sense vibration directed upward. In contrast, in a case where the operation button 22c disposed on the lower side is operated, the tactile sensation presenting part 33 causes the vibration mechanism 21a to generate a pseudo kinesthetic sense vibration directed downward. Similarly, in a case where the operation button 23a is operated, the tactile sensation presenting part 33 causes the vibration mechanism 21b to generate a pseudo kinesthetic sense vibration directed upward and, in a case where the operation button 23c is operated, causes the vibration mechanism 21b to generate a pseudo kinesthetic sense vibration directed downward. A tactile sensation corresponding to the operational input by the user can thereby be generated in a pseudo manner.

Moreover, the tactile sensation presenting part 33 may vary the waveform pattern itself such as the waveform shape and the frequency, of the feedback vibration to be generated in accordance with selection as to which operation member the user operates. A sense of the touch that is different for each of the operation members can thereby be presented.

As a specific example, in a case where a pulse waveform of a sine wave is used as the feedback vibration, a lighter sense of touch is established as the frequency becomes higher, and a heavier sense of touch is established as the frequency becomes lower. In a case where a specific operation button is operated, a sense of touch like pressing down a soft button can therefore be presented to the user by repeatedly presenting a pulse waveform at a relatively low frequency gradually weakening the pulse waveform to cause the user to feel the afterglow. Moreover, a sense of touch like pressing down a hard button can be presented to the user by generating a feedback vibration having a waveform shape whose attack is strong (whose amplitude immediately after its start is large).

Moreover, the tactile sensation presenting part 33 may acquire index values that indicate an amount of an operation executed by the user for the operation member and a strength of the operation, and may vary the strength of the feedback vibration in accordance with the index values. More specifically, in a case where the operation member is an analog button or the like with which the amount of the operation can be acquired, the operational input receiving part 31 acquires numerical value information that indicates the amount of the operation therefor. The tactile sensation presenting part 33 determines the strength of the feedback vibration in accordance with the acquired numerical value of the amount of the operation. Otherwise, in a case where a pressure-sensitive sensor or the like is disposed on the front surface of the operation member and the strength of the pressing-down operation by the user is detectable, the tactile sensation presenting part 33 may determine the strength of the feedback vibration in accordance with the numerical value indicating the strength of the operation.

As an example, the tactile sensation presenting part 33 varies the strength of the amplitude of the vibration to be generated in accordance with a detected value such as generation of a vibration having an amplitude of 0.1 in a case where the detected value of the pressure-sensitive sensor is 10 or greater, and generation of a vibration having an amplitude of 1.0 in a case where the detected value of the pressure-sensitive sensor is 100 or greater. In addition, in this example, it may be assumed that the tactile sensation presenting part 33 does not generate any feedback vibration until the detected value of the pressure-sensitive sensor exceeds a predetermined off-set value.

Furthermore, the tactile sensation presenting part 33 may vary not only the strength of the feedback vibration but also the timing of generation of the feedback vibration in accordance with the index values that indicate the amount of the operation and the strength of the operation. More specifically, the tactile sensation presenting part 33 can present a tactile sensation that varies in stages during the operation, by generating a feedback vibration at a timing at which the amount of the operation exceeds a predetermined threshold value.

As an example, a case will be described where the user operates an analog button with which the amount of the operation can be acquired as a numerical value in a range from 0 (no operation) to 1.0 (the maximal amount). The tactile sensation presenting part 33 generates the feedback vibration at each of the timing at which the acquired amount of the operation exceeds 0.5 and the timing at which the acquired amount of the operation reaches 1.0. A tactile sensation like operating a button capable of being pushed in two stages can thereby be presented to the user. Furthermore, the contents of the feedback vibration to be presented may be varied for each threshold value such as presenting a relatively light sense of touch in the intermediate stage and presenting a heavy sense of touch when the amount of the operation becomes the maximal amount.

Otherwise, the tactile sensation presenting part 33 may present the sense of touch during the operation to the user in stages by presenting a relatively short feedback vibration every time the amount of the operation increases by 0.1, for example. In the example where the vibration is presented at a plurality of times as above, in a case where the user operates an analog button at once, the feedback vibrations in the course of the presentation may not be presented or the feedback vibrations at the plurality of times may sequentially be generated after the completion of the operation. According to the control as above, the tactile sensation in the course of the execution of the operation can precisely be presented to the user, so that the frictional feeling and the difficulty in pushing that are present when the button is pushed in can be expressed.

In addition, regarding a magnitude of a pressure felt by a human being, it is known that the Stevens's poser law is present. Taking this into consideration, the tactile sensation presenting part 33 may present the feedback vibration every time the amount of the operation increases by a constant increment (for example, 0.1) while the tactile sensation presenting part 33 may determine the timing of the generation of the feedback vibration using a plurality of threshold values for which the increment therebetween gradually increases. As a specific example, in a case where the amount of the operation is defined in a numerical value range from 0 to 1.0, it is assumed that the tactile sensation presenting part 33 presents a feedback vibration every time the amount of the operation exceeds each of a plurality of threshold values that are not those having a constant increment like 0.1, 0.2, and 0.3 but that are those having a gradually increasing increment like 0.1, 0.3, 0.6, and 1.0. Provision of the feedback that matches with the operation feeling of the human being is thereby enabled.

It is assumed in the above description that the timing of the generation of the feedback vibration is determined in accordance with the absolute value of the index values indicating the amount of the operation and the strength of the operation while the tactile sensation presenting part 33 may determine whether or not the feedback vibration is generated and, moreover, the strength or the like of the feedback vibration to be generated, in accordance with the variation amount per unit time of this index value.

As a specific example, it is assumed that the tactile sensation presenting part 33 acquires the detected value of the pressure-sensitive sensor every predetermined time period at the time point. The feedback vibration is thereafter generated in a case where a newly acquired detected value is larger than a previous detected value by a predetermined threshold value or more. For example, in a case where the threshold value is 10 and the detected values of the pressure-sensitive sensor acquired every predetermined time period are 0, 12, 21, and 83, the detected value varies from 0 to 12 at the second pressure-sensitive value acquisition, the variation amount of 12 is equal to or greater than 10, and a predetermined feedback vibration is therefore generated. At the third acquisition, the variation amount of 21-12=9 is smaller than the threshold value of 10, and no feedback vibration is therefore generated. At the fourth acquisition, the variation amount of 62 is equal to or greater than the threshold value of 10, and a feedback vibration is therefore generated. At this time, the tactile sensation presenting part 33 may vary the strength of the feedback vibration to be presented in accordance with the variation amount. Moreover, the number of presentation sessions of the feedback vibration may be determined in accordance with the variation amount. For example, in the above-described example, at the fourth acquisition, the variation amount of 62 is equal to or greater than a sixfold value of the threshold value of 10, and it may therefore be assumed that the feedback vibration is generated at six times.

Moreover, in a case where an operation for the operation member is repeated in a short time period, the presentation of the feedback vibration may be limited. For example, in a case where the user repeatedly strikes an analog button, this makes it difficult to present a feedback vibration for each of the operations. In a case where it is determined that repeated operations are executed in a short time period, the tactile sensation presenting part 33 therefore limits generation instruction for the feedback vibration. More specifically, for example, in a case where the number of times when the amount of the operation exceeds the threshold value exceeds predetermined number of times in a predetermined time period, the tactile sensation presenting part 33 limits the generation instruction for the feedback vibration. Moreover, in a case where temporal variations of the numerical values indicating the amount of the operation and the strength of the operation each exceed a predetermined threshold value, the tactile sensation presenting part 33 may limit the generation instruction for the feedback vibration. In addition, even in a case where the user repeats the operation for the operation member, it may be assumed that the tactile sensation presenting part 33 generates the feedback vibration for the first operation.

Furthermore, even in a case where the user operates an operation member including no mechanism that directly acquires the amount of the operation and the strength of the operation, the tactile sensation presenting part 33 may estimate the strength of the operation executed by the user using another sensor disposed on the operation device 20. For example, in a case where a motion sensor such as an acceleration sensor is incorporated in the operation device 20, the tactile sensation presenting part 33 may refer to a detection result of the motion sensor at a timing at which the operation member receives the operation and may estimate the strength of the operation. In a case where it is determined that an acceleration is applied to the operation device 20 at the moment of the operation by the user, it can be estimated that the magnitude of the acceleration represents the strength of the operation. The tactile sensation presenting part 33 therefore varies the strength of the feedback vibration in accordance with the magnitude of the detected acceleration.

Otherwise, the tactile sensation presenting part 33 may estimate the strength of the operation in accordance with an audio signal collected by a microphone disposed on the operation device 20. When the user operates an operation button, an operation sound is generated. The tactile sensation presenting part 33 collects the operation sound using the microphone and can thereby estimate the strength of the operation from the sound volume thereof. A feedback vibration associated with the strength of the operational input by the user can be generated by varying the strength of the feedback vibration in accordance with the estimated strength of the operation.

Moreover, in a case where an application vibration and a feedback vibration need to be simultaneously generated, the tactile sensation presenting part 33 outputs a control order that causes a vibration to be generated, the vibration being formed by synthesizing the vibration waveforms of the above two vibrations. The operation device 20 can thereby present both the application vibration and the feedback vibration to the user only by simply generating a vibration in accordance with the control order output by the tactile sensation presenting part 33.

In this case, in a case where a peak of the application vibration and a peak of the feedback vibration overlap each other in terms of the timing, the feedback vibration may not consequently be recognized by the user. In such a case, the tactile sensation presenting part 33 therefore may execute a correction process that delays the timing of the generation of the feedback vibration.

Figure 4:
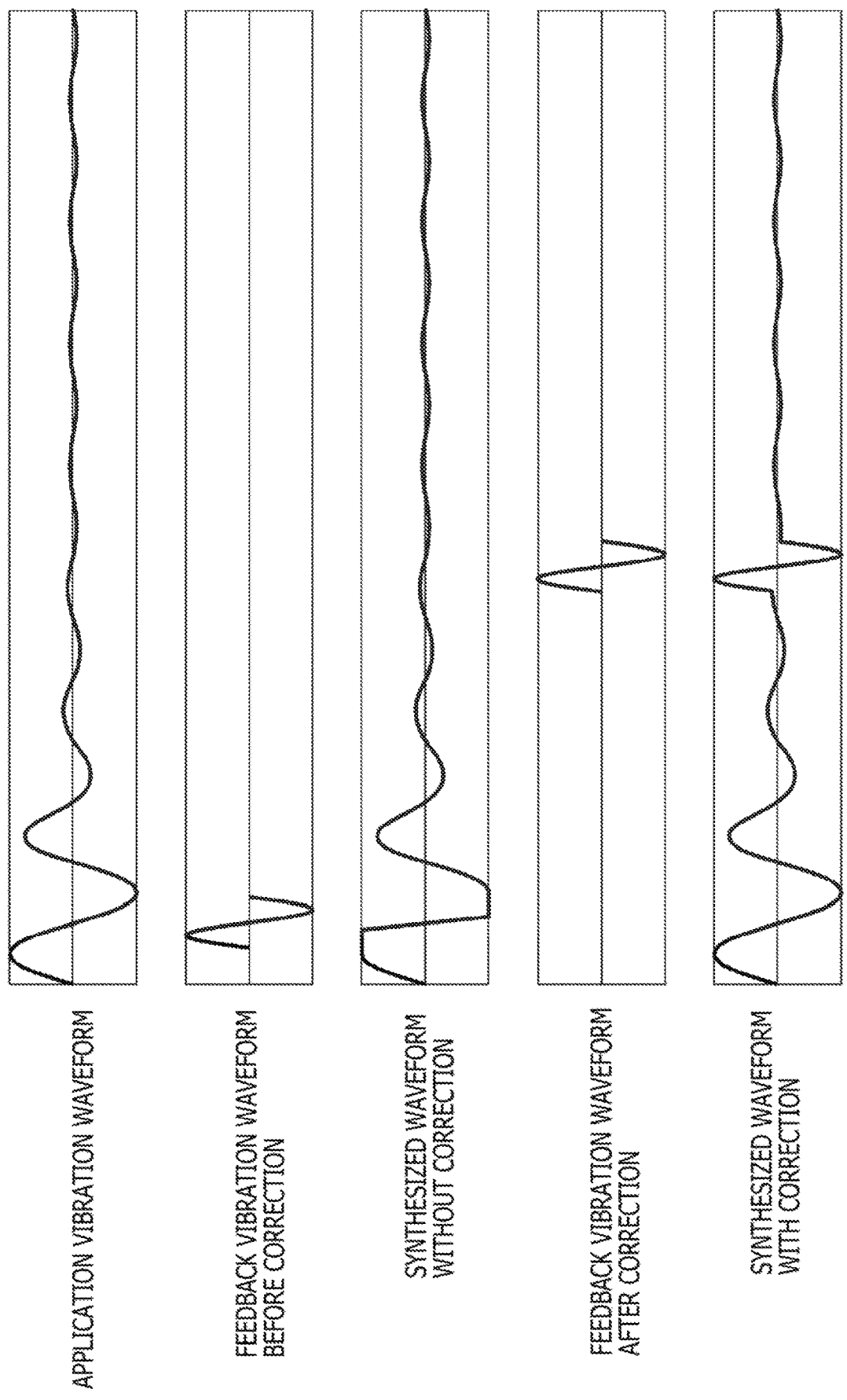
FIG. 4 is a diagram explaining an example of a correction process for a feedback vibration.

FIG. 4 is a diagram explaining contents of the correction process as above. The first row (the uppermost row) of the drawing depicts a waveform of the application vibration, and the second row depicts the original timing of the generation of the feedback vibration in accordance with the operational input by the user. In a case where these two waveforms are synthesized with each other as they are without executing the correction process, a waveform is consequently formed in which the timing of the generation of the feedback vibration is difficult to be found as depicted in the third row of the drawing. The tactile sensation presenting part 33 therefore executes the correction process that delays the waveform of the feedback vibration as depicted in the fourth row of the drawing. When the corrected waveform of the feedback vibration is synthesized with the waveform of the application vibration depicted in the first row, the waveform as depicted in the fifth row (the lowermost row) of the drawing is acquired. Recognition of the feedback vibration by the user can be facilitated by causing the vibration mechanism 21 to operate in accordance with the waveform as above.

Otherwise, the tactile sensation presenting part 33 may execute a correction process that reduces the amplitude of the application vibration whose timing overlaps with that of the feedback vibration, instead of varying the timing of the generation of the feedback vibration. More specifically, for example, the tactile sensation presenting part 33 reduces, by a predetermined rate, the amplitude of the application vibration presented for the generation time period of the feedback vibration and predetermined time periods before and after the generation time period of the feedback vibration. According to the control as described above, recognition of the generation of the feedback vibration by the user can be facilitated. Furthermore, in this case, the tactile sensation presenting part 33 may correct the amplitude of the application vibration such that the amplitude is gradually reduced, not instantaneously varying the amplitude to be small.

Moreover, in a case where the operation device 20 includes a plurality of the vibration mechanisms 21, when the tactile sensation presenting part 33 generates the application vibration and the feedback vibration at the same time, the tactile sensation presenting part 33 may cause the different vibration mechanisms 21 to present the respective vibrations. For example, when the timings of the application vibration and the feedback vibration overlap each other, the tactile sensation presenting part 33 causes the application vibration to be generated from the vibration mechanism 21a and causes the feedback vibration to be generated from the vibration mechanism 21b. In this example, the tactile sensation presenting part 33 does not synthesize both of the vibration waveforms with each other and transmits these vibration waveforms each as an independent control order, together with information that designates the vibration mechanism 21 to be caused to generate, to the operation device 20. Recognition of the feedback vibration by the user can thereby be facilitated.

In addition, the tactile sensation presenting part 33 may execute control that causes the application vibration to be generated from any one of the vibration mechanisms 21 and that causes the feedback vibration to be generated from the plurality of vibration mechanisms 21. For example, the tactile sensation presenting part 33 causes the vibration mechanism 21a to generate the vibration formed by synthesizing the two vibrations with each other and causes the vibration mechanism 21b to generate only the feedback vibration. In contrast, it may be assumed that the tactile sensation presenting part 33 causes the feedback vibration to be generated from one of the vibration mechanisms 21 and causes the application vibration to be generated from the plurality of vibration mechanisms 21. The plurality of vibration mechanisms 21 generate vibrations that are different from each other also by the control as above, and recognition of the feedback vibration by the user can therefore be facilitated.

Figures 5, 6:
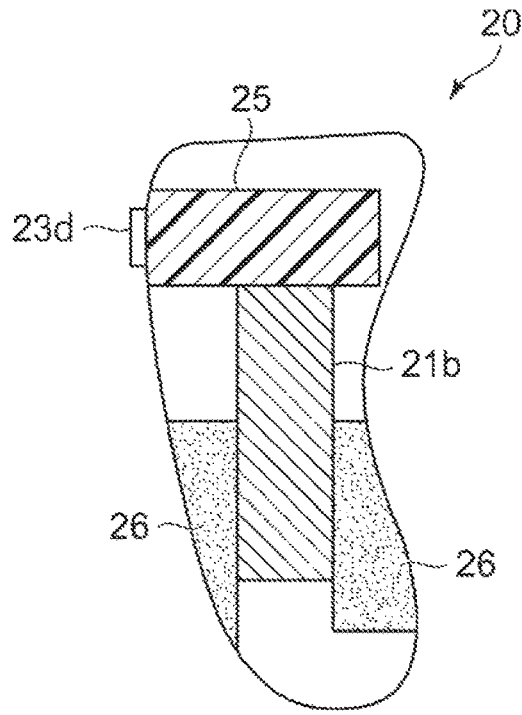
FIG. 5 is a cross-sectional diagram schematically depicting an example of a configuration of the operation device.
FIG. 6 is a diagram depicting an example of vibration data.

Furthermore, in this embodiment, the operation device 20 may include structures as described below to effectively deliver to the user the feedback vibration by the vibration mechanism 21 disposed at a position distant from the operation buttons. FIG. 5 schematically depicts a state where a cross-section passing through the grip portion on the right side of the operation device 20 in this example is seen from the right side. In the example of this drawing, one end of the vibration mechanism 21b is fixed to a structure 25. Moreover, a substrate having the operation buttons 23a to 23d disposed thereon is also coupled to the structure 25, and when the structure 25 vibrates, the operation buttons 23a to 23d are adapted to also vibrate associated with this vibration.

Meanwhile, the other end of the vibration mechanism 21b on a side opposite to the one end on the side on which the vibration mechanism 21b is fixed to the structure 25 is supported by supporting bodies 26. In this regard, the supporting bodies 26 each include a material whose stiffness is lower than the structure 25 and are disposed being separated from the structure 25. For example, the supporting bodies 26 may each include a sponge or the like. Thus, delivery of the vibration generated by the vibration mechanism 21b to the user's fingers can be facilitated by fixing the one end of the vibration mechanism 21b on the side close to the operation members to the member having the stiffness higher than the other end on the opposite side thereof and causing the member having the high stiffness to associate with the operation members. Accordingly, the user is likely to feel the tactile sensation that corresponds to the operational input.

In the above description, it is assumed that the information processing apparatus 10 that is communicably connected to the operation device 20 and that is independent from the operation device 20 functions as the control apparatus according to an embodiment of the present invention. The control apparatus according to the embodiment of the present invention may however be formed integrally with the operation device 20. In other words, it may be assumed that a microcomputer or the like incorporated in the operation device 20 functions as the control apparatus according to the embodiment of the present invention. In this case, the control apparatus in the operation device 20 realizes at least part of the functions of the operational input receiving part 31 and the tactile sensation presenting part 33 described above. The control apparatus can thereby generate the feedback vibration in accordance with the operational input by the user to the operation member disposed on a front surface of a housing of the operation device 20 without communicating with an external device. Accordingly, a delay caused by the communication is less likely to be generated, and a tactile sensation can immediately be presented in response to the operation by the user.

Note that, also in this example, the control apparatus in the operation device 20 may cause the vibration mechanism 21 to operate in accordance with the control order transmitted from the information processing apparatus 10. In this case, the vibration mechanism 21 generates the application vibration in accordance with the control order from the information processing apparatus 10 and consequently generates also the feedback vibration in accordance with the operational input by the user.

Furthermore, in this example, it may be assumed that the contents of the feedback vibration is designated from the information processing apparatus 10 in advance. More specifically, the information processing apparatus 10 transmits in advance the vibration data indicating the vibration waveform of the feedback vibration to the control apparatus in the operation device 20 in an unoccupied time or the like. For example, in a case where the information processing apparatus 10 executes a game program, a timing is generated at which playing of the game is interrupted due to scene switching, loading of the game, or the like. At this timing, the information processing apparatus 10 transmits the vibration data to the operation device 20. The control apparatus in the operation device 20 stores the received vibration data in a memory. In addition, when the user thereafter operates the operation member, the control apparatus reads the vibration data in the memory and causes the vibration mechanism 21 to generate a vibration in accordance with the contents thereof. In this manner, the feedback vibration in accordance with a request of the information processing apparatus 10 can be generated avoiding the communication delay.

In this example, the control part 11 of the information processing apparatus 10 may transmit new vibration data to the operation device 20 associated with the progress of the process, and may cause the operation device 20 to overwrite old vibration data with the new vibration data. The contents of the feedback vibration can thereby be varied with the progress of the process.

FIG. 6 depicts a specific example of the contents of the vibration data transmitted from the information processing apparatus 10 to the operation device 20. In the example in this drawing, the data type of the waveform data (pulse cord modulation (PCM) waveform data or waveform data identified by the frequency and the waveform shape) and the content of the waveform data are stored for each of the operation buttons. Moreover, pieces of flag information may be included therein that each designate whether or not a vibration is generated when the operation button is pressed down, whether or not a vibration is generated when the operation button is released, and whether or not a vibration is repeatedly generated during the operation. Moreover, in a case where the vibration is repeatedly generated, information may be included therein that designates a repetition cycle (a time interval for the repetition) and delay time until the repeated vibration is started after the button is pressed down. Furthermore, information may be included therein that designates what control to be executed for a case where an application program does not use the operation button (that is, the case where the operational input to the operation button is ignored by the application program). More specifically, the information designating the operation for the time when this operation button is unused may designate, in a case where an operational input to the operation button is present, whether the feedback vibration similar to that for the other operation buttons is generated, whether no vibration is generated, or whether a vibration for warning that is different from the ordinary feedback vibration is generated. The control apparatus of the operation device 20 can generate the feedback vibration in real time by receiving in advance the vibration data including the above various types of information and, in a case where an operation is executed by the user, causing the vibration mechanism 21 to operate in accordance with the contents of the operation.

In addition, the data of the vibration waveform stored in the memory in the operation device 20 may be waveform data of a time history, or may be described by a function expression such as a sin function. Moreover, the stored data of the vibration waveform may be the data indicating the waveform exactly as the vibration which is generated by the vibration mechanism 21 or may be data of a basic waveform to be used being synthesized.

In a case where the data of the basic waveform is used, for example, at the time of shipment or the like of the operation device 20, data of a plurality of types of basic waveform is stored in advance in the memory. The information processing apparatus 10 transmits waveform designation information that designates which basic waveform to be used, how to synthesize, and the like to the operation device 20, instead of transmitting the data indicating the contents of the vibration waveform itself as depicted in FIG. 6 described above. The control apparatus in the operation device 20 generates the vibration waveform to actually be used, on the basis of the basic waveform stored in the memory in accordance with contents of the waveform designation information. The control apparatus thereafter causes the vibration mechanism 21 to vibrate in accordance with the generated vibration waveform.

As a specific example, it is assumed that a waveform of a sine wave (basic waveform A) and a waveform of a saw-tooth wave (basic waveform B) each for one cycle at 100 Hz are prepared each as a basic waveform. The information processing apparatus 10 transmits the waveform designation information that designates a type, an amplitude, a reproduction time period, a reproduction speed, addition conditions, and the like of the basic waveform. For example, the information processing apparatus 10 transmits the waveform designation information including contents such as "reproduction of the basic waveform A with an amplitude of 0.5, for a reproduction time period of 50 ms, and at a reproduction speed of 1.0." In this case, the control apparatus in the operation device 20 generates the actual vibration waveform by processing the basic waveform A. Otherwise, the information processing apparatus 10 may transmit waveform designation information that designates the amplitude and the reproduction speed of each of the plurality of basic waveforms to synthesize the two with each other, such as "from the time 0 to 100 ms, addition of the basic waveform A with an amplitude of 0.5 and a reproduction speed of 1.0 and the basic waveform B with an amplitude of 0.4 to each other to synthesize these with each other." Otherwise, the information processing apparatus 10 may designate information for connection of the plurality of waveforms to each other in the time direction, such as "from the time 0 to 100 ms, output of the basic waveform A with an amplitude of 0.8 and a reproduction speed of 0.8 and, from the time 100 to 200 ms, output of the basic waveform B with an amplitude of 0.4 and a reproduction speed of 1.2."

Note that, in a case where the basic waveform is stored using a function such as a sine wave, it may be assumed that the information processing apparatus 10 transmits parameters such as the amplitude, the frequency, and the length as the waveform designation information and the actual vibration waveform is generated on the basis of the stored function. The parameters in this case may be fixed values or may be values each varying with time. For example, a vibration whose amplitude varies with time can be presented to the user by transmitting the waveform designation information that designates, for example, the temporal variation (envelope) of the amplitude. According to the control as above, diverse vibrations can be generated in accordance with a request by the application program despite the fact that only the limited number of basic waveforms is stored in the operation device 20.

Second Embodiment

The second embodiment of the present invention will be described below. In this embodiment, the shape of the operation device, the operation members disposed thereon, and the like are different from those of the first embodiment. Meanwhile, the functions realized by the information processing apparatus 10 are partially common to the first embodiment. The constituent elements and their functions common to the first embodiment will be referred to using the same reference numerals as those in the first embodiment and will not again be described in detail.

Figure 7:
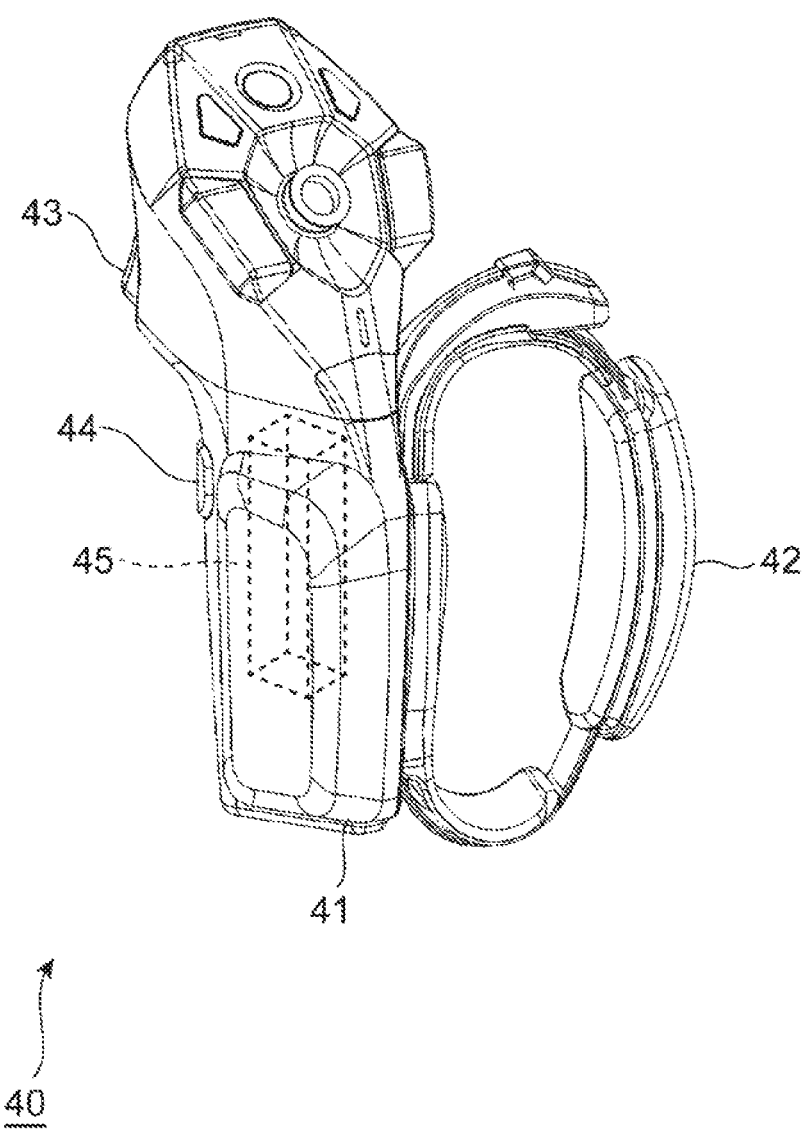
FIG. 7 is a diagram depicting an outer appearance of an operation device in a second embodiment of the present invention.

The information processing apparatus 10 functioning as a control apparatus in this embodiment is connected to an operation device 40 as exemplified in FIG. 7. The operation device 40 includes a main body part 41 and a fixture 42 attached to the main body part 41, and the user puts the user's own palm through the fixture 42 and grips the main body part 41 with the user's hand to use the operation device 40.

On the side of the front face of the main body part 41, a trigger button 43 operated by the user's forefinger and a pressure-sensitive sensor 44 operated by the user's middle finger are disposed. When the user executes an operation of pressing down a front surface of the pressure-sensitive sensor 44 using the user's middle finger, the pressure-sensitive sensor 44 detects the pressure thereof and transmits the detection result to the information processing apparatus 10. Moreover, the main body part 41 has a vibration mechanism 45 incorporated therein, and when the user executes the pressing-down operation for the pressure-sensitive sensor 44, a tactile sensation is presented to the user by causing this vibration mechanism 45 to operate. Accordingly, the user can operate the pressure-sensitive sensor 44 like the operation button in a pseudo manner despite the fact that the pressure-sensitive sensor 44 itself cannot be physically pushed down like an ordinary operation button and the like.

The operational input receiving part 31 of the information processing apparatus 10 acquires the result of the detection by the pressure-sensitive sensor 44 from the operation device 40 as information indicating the contents of the operation by the user. The tactile sensation presenting part 33 causes the vibration mechanism 45 to generate the feedback vibration in accordance with this result of the detection by the pressure-sensitive sensor 44.

In a case where the pressure value detected by the pressure-sensitive sensor 44 exceeds a predetermined threshold value Th, the tactile sensation presenting part 33 outputs a control order that causes the feedback vibration to be generated. The vibration mechanism 45 operates in accordance with this, and a tactile sensation in accordance with the pressing-down operation is thereby presented to the user.

Furthermore, the tactile sensation presenting part 33 may output the control order that causes the feedback vibration to be generated not at the timing at which the pressure value of the pressure-sensitive sensor 44 actually exceeds the threshold value Th but at the timing at which it is estimated that the pressure value exceeds the threshold value Th after a predetermined time period elapses. A time lag is generated from the time when the tactile sensation presenting part 33 outputs the control order up to the time when the vibration mechanism 45 actually starts its operation. Especially, in a case where the information processing apparatus 10 and the operation device 40 are wirelessly connected to each other, a certain length of time is necessary until the control order reaches the operation device 40, and a delay is therefore generated from the time when the user executes the pressing-down operation to the time when the feedback vibration starts. The tactile sensation presenting part 33 therefore predicts the pressure value detected after a time period T elapses from a time point on the basis of the temporal variation of the past pressure value up to the time point (that is, the detected values of the pressure-sensitive sensors 44 taken from the plurality of past detection sessions) every predetermined time period. In a case where it is thereafter determined that the predicted value exceeds the threshold value Th, at this timing, the tactile sensation presenting part 33 outputs the control order for the feedback vibration. The feedback vibration can immediately be generated at the timing at which the pressure value exceeds the threshold value Th.

Figure 8:
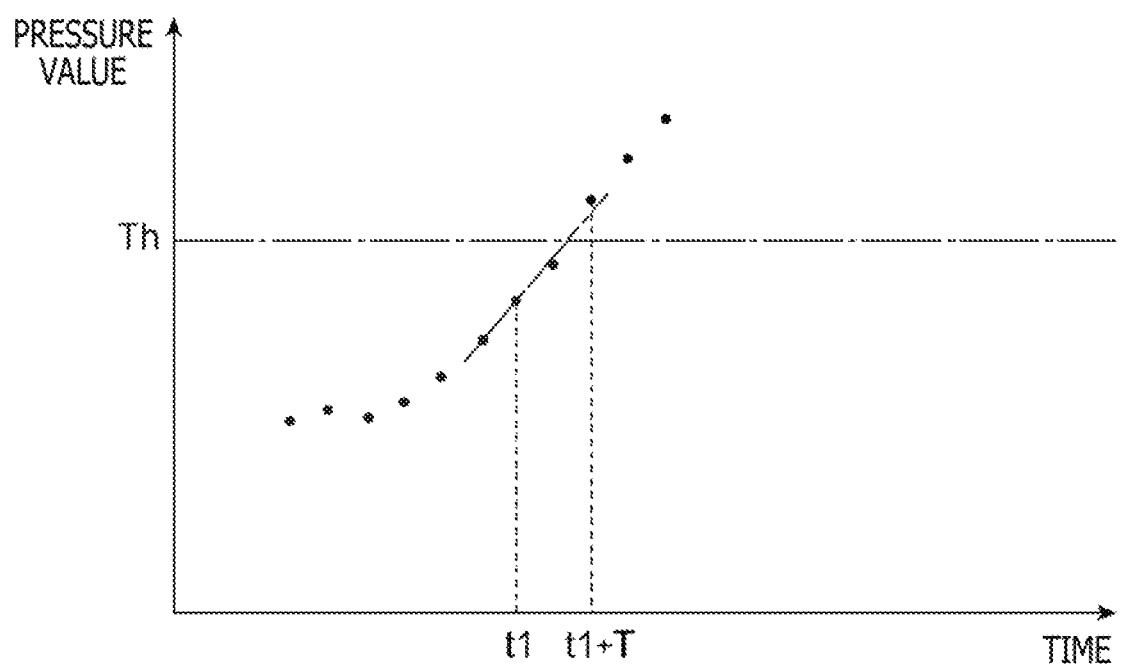
FIG. 8 is a diagram explaining control for the feedback vibration in accordance with a pressure value detected by a pressure-sensitive sensor.

FIG. 8 is a diagram explaining a specific example of the control as above, and depicts the temporal variation of the pressure value detected by the pressure-sensitive sensor 44. In this example, at a time t1, a predicted value of the pressure value at a time (t1+T) calculated on the basis of the temporal variation of the pressure value taken so far consequently exceeds the threshold value Th. The tactile sensation presenting part 33 therefore outputs the control order for the feedback vibration at this timing.

Moreover, the tactile sensation presenting part 33 may vary the threshold value Th to determine that the feedback vibration is started, on the basis of the state of the operation device 40 at the time when the operational input is executed. In this example, in addition to the pressure value detected by the pressure-sensitive sensor 44, the operational input receiving part 31 acquires information regarding the state of the operation device 40 at the time when the pressure value is acquired.

More specifically, for example, the operational input receiving part 31 acquires the result of the detection by the motion sensors such as the acceleration sensor and the like that are incorporated in the operation device 40. In a case where it is determined that the operation device 40 is in motion from the result of the detection by the motion sensor, the tactile sensation presenting part 33 increases the threshold value Th. This is because a pressure is unintentionally applied to the pressure-sensitive sensor 44 when the user shakes the operation device 40, or the like. Note that the tactile sensation presenting part 33 may vary the threshold value Th to be larger as the moving speed is higher in accordance with the moving speed at the time point.

Moreover, the tactile sensation presenting part 33 may acquire information indicating presence or absence of the operational input to another operation member as a piece of information regarding the state of the operation device 40. For example, in a case where the operational input receiving part 31 receives an operational input to the trigger button 43, the tactile sensation presenting part 33 may increase the threshold value Th for the pressure value of the pressure-sensitive sensor 44. In a case where the user executes an operation of pushing down the trigger button 43 using the user's forefinger, it is assumed that the user unconsciously exerts strength in the user's middle finger. In a case where the user executes the operational input using another user's finger, false detection can be avoided by increasing the threshold value Th.

As described above, according to the control apparatus of each of the embodiments of the present invention, a tactile sensation can be presented in a manner capable of improving the operation feeling more in a case where a tactile sensation in accordance with the operational input by the user to the operation device is presented.

Note that the embodiments of the present invention are not limited to those described above. For example, at least some of the processes that are assumed to be executed by the tactile sensation presenting part 33 in the above description may be realized by an application program. For example, the application executing part 32 may determine the contents of the feedback vibration in accordance with the contents of the operational input received by the operational input receiving part 31 and may output the vibration instruction that causes the feedback vibration to be generated similar to the application vibration.

Moreover, although it is assumed that the vibration mechanism generates the vibration and a tactile sensation corresponding to the operational input by the user is thereby presented in the above description, the present invention is not limited to this, and the operation device may present the tactile sensation that corresponds to the operational input by the user using any of various types of tactile sensation presentation mechanism such as a kinesthetic sense presentation mechanism, for example. Also in this case, the operation feeling can be improved by determining a strength and contents of the kinesthetic sense to be presented by the kinesthetic sense presentation mechanism, in accordance with the position at which the operation member operated by the user is disposed, or the like.

REFERENCE SIGNS LIST

10 Information processing apparatus, 11 Control part, 12 Storing part, 13 Interface part, 14 Display apparatus, 20 Operation device, 21 Vibration mechanism, 22*a* to 22*d*, 23*a* to 23*d*, 24 Operation button, 25 Structure, 26 Supporting body, 31 Operational input receiving part, 32 Application executing part, 33 Tactile sensation presenting part, 40 Operation device, 41 Main body part, 42 Fixture, 43 Trigger button, 44 Pressure-sensitive sensor, 45 Vibration mechanism

The invention claimed is:

1. A control apparatus for an operation device, the control apparatus being connected to the operation device including an operation member and a tactile presentation mechanism, the control apparatus comprising:
    an operational input receiving part receiving an operational input by a user to the operation member; and
    a tactile sensation presenting part presenting a tactile sensation that corresponds to the operational input, to the user by causing the tactile presentation mechanism to operate when the operational input is received, wherein the tactile sensation presenting part varies contents of the tactile sensation to be presented to the user, in accordance with contents of the operational input received by the operational input receiving part.

2. The control apparatus for an operation device according to claim 1, wherein the operation device includes a plurality of operation members, the operational input receiving part receives an operational input by the user to any of the plurality of operation members, and the tactile sensation presenting part varies the contents of the tactile sensation to be presented to the user in accordance with a disposition position of the operation member operated by the user on the operation device.

3. The control apparatus for an operation device according to claim 2, wherein the operation device includes a plurality of vibration mechanisms as the tactile presentation mechanism, and the tactile sensation presenting part presents the tactile sensation that corresponds to the operational input to the user by causing each of the plurality of vibration mechanisms to generate a vibration having strength determined in accordance with the disposition position.

4. The control apparatus for an operation device according to claim 2, wherein the tactile sensation presenting part presents a pseudo kinesthetic sense in a direction corresponding to a disposition position of the operation member operated by the user on the operation device.

5. The control apparatus for an operation device according to claim 1, wherein the tactile sensation presenting part acquires information indicating strength of the operational input to the operation member by the user, and varies strength of the tactile sensation to be presented to the user in accordance with the acquired information.

6. The control apparatus for an operation device according to claim 1, wherein the tactile sensation presenting part acquires information indicating strength of the operational input to the operation member by the user, and determines a timing at which the tactile sensation is presented to the user in accordance with the acquired information.

7. The control apparatus for an operation device according to claim 1, wherein the operation member is a pressure-sensitive sensor, the operational input receiving part receives a pressing-down operation by the user to the pressure-sensitive sensor, and the tactile sensation presenting part varies the contents of the tactile sensation to be presented to the user in accordance with a state of the operation device when the operational input receiving part receives the pressing-down operation.

8. The control apparatus for an operation device according to claim 7, wherein the tactile sensation presenting part determines a presentation timing of the tactile sensation in accordance with temporal variation of past pressure values detected by the pressure-sensitive sensor.

9. The control apparatus for an operation device according to claim 8, wherein the tactile sensation presenting part estimates a timing at which a pressure value exceeds a predetermined threshold value in accordance with the temporal variation of the past pressure values detected by the pressure-sensitive sensor, and determines a presentation timing of the tactile sensation in accordance with a result of the estimation.

10. The control apparatus for an operation device according to claim 7, wherein the tactile sensation presenting part starts presentation of the tactile sensation at a timing at which a pressure value detected by the pressure-sensitive sensor exceeds a predetermined threshold value, and varies the threshold value in accordance with whether or not the operation device is in motion.

11. The control apparatus for an operation device according to claim 7, wherein the tactile sensation presenting part starts presentation of the tactile sensation at a timing at which a pressure value detected by the pressure-sensitive sensor exceeds a predetermined threshold value, and varies the threshold value in accordance with presence or absence of an operational input to another operation member included in the operation device.

12. An operation device comprising:
an operation member;
a structure that is coupled with the operation member; and
a vibration mechanism that has one end thereof fixed to the structure and the other end thereof supported by another supporting body, wherein the structure has stiffness that is higher than the another supporting body.

13. A control method for an operation device including an operation member and a tactile presentation mechanism, the control method comprising:
receiving step of receiving an operational input by a user to the operation member; and
presenting a tactile sensation that corresponds to the operational input, to the user by causing the tactile presentation mechanism to operate when the operational input is received,
wherein at the presenting, contents of the tactile sensation to be presented to the user are varied in accordance with contents of the operational input received at the receiving.

14. A non-transitory, computer readable storage medium containing a computer program, which when executed by a computer, causes the computer to control an operation device including an operation member and a tactile presentation mechanism, by carrying out actions, comprising:
an operational input receiving part receiving an operational input by a user to the operation member; and
presenting a tactile sensation that corresponds to the operational input, to the user by causing the tactile presentation mechanism to operate when the operational input is received,
wherein the presenting includes varying contents of the tactile sensation to be presented to the user, in accordance with contents of the operational input received by the receiving.

* * * * *